(12) United States Patent
Qi et al.

(10) Patent No.: US 8,824,744 B2
(45) Date of Patent: *Sep. 2, 2014

(54) CONTENT-ADAPTIVE PIXEL PROCESSING SYSTEMS, METHODS AND APPARATUS

(71) Applicant: QUALCOMM Incorporated, San Diego, CA (US)

(72) Inventors: Yingyong Qi, San Diego, CA (US); Ning Bi, San Diego, CA (US); Xuerui Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/045,158

(22) Filed: Oct. 3, 2013

(65) Prior Publication Data

US 2014/0029807 A1    Jan. 30, 2014

Related U.S. Application Data

(63) Continuation of application No. 13/160,457, filed on Jun. 14, 2011, now Pat. No. 8,553,943.

(51) Int. Cl.
*G06K 9/00* (2006.01)
*H04N 7/18* (2006.01)

(52) U.S. Cl.
USPC .......................................... 382/107; 348/154

(58) Field of Classification Search
USPC .......... 382/103, 107, 173, 236, 291; 348/154, 348/155, 169–172, 352; 345/474, 612, 698
See application file for complete search history.

(56) References Cited

U.S. PATENT DOCUMENTS

| | | | |
|---|---|---|---|
| 5,680,487 A | 10/1997 | Markandey | |
| 5,930,379 A | 7/1999 | Rehg et al. | |
| 6,507,661 B1 * | 1/2003 | Roy | 382/107 |
| 7,085,401 B2 * | 8/2006 | Averbuch et al. | 382/103 |
| 7,418,113 B2 * | 8/2008 | Porikli et al. | 382/103 |
| 2010/0054536 A1 | 3/2010 | Huang et al. | |
| 2010/0124361 A1 | 5/2010 | Gaddy | |
| 2010/0215282 A1 | 8/2010 | Van Beek et al. | |
| 2010/0245672 A1 | 9/2010 | Erdler et al. | |
| 2012/0321139 A1 | 12/2012 | Qi et al. | |

OTHER PUBLICATIONS

An Y., et al., "Neighborhood-Based Weighted Regularization o f Video Sequence Super-Resolution", Computational Intelligence and Security, 2009. CIS '09. International Conference on, IEEE, Piscataway, NJ, USA, Dec. 11, 2009, pp. 146-150, XP031598442.
Bagnato, et al; "Optical flow and depth from motion for omnidirectional images using a TV-L1 variational framework on graphs", 2009 16th IEEE International Conference on Image Processing (ICIP), Nov. 7-10, 2009, pp. 1469-1472.

(Continued)

*Primary Examiner* — Abolfazl Tabatabai
(74) *Attorney, Agent, or Firm* — Knobbe Martens Olson & Bear LLP

(57) ABSTRACT

Embodiments include methods and systems for context-adaptive pixel processing based, in part, on a respective weighting-value for each pixel or a group of pixels. The weighting-values provide an indication as to which pixels are more pertinent to pixel processing computations. Computational resources and effort can be focused on pixels with higher weights, which are generally more pertinent for certain pixel processing determinations.

38 Claims, 5 Drawing Sheets

(56) References Cited

OTHER PUBLICATIONS

Brox T., et al., "Large Displacement Optical Flow: Descriptor Matching in Variational Motion Estimation", IEEE Transactions on Pattern Analysis and Machine Intelligence, IEEE Service Center, Los Alamitos, CA, US, vol . 33, No. 3, Mar. 1, 2011, pp. 500-513, XP01137351.

Horn et al. "Determining Optical Flow." Artificial Intelligence, 17:185-203 (1981).

International Search Report and Written Opinion—PCT/US2012/040922—ISA/EPO—Aug. 16, 2012 (103239WO) .

Kosov, et al., "Accurate Real-Time Disparity Estimation with Variational Methods," Published in: Proceedings of the 5th International Symposium on Advances in Visual Computing, Nov. 30-Dec. 2, 2009, pp. 796-807.

Li X., et al., "Motion detail preserving optical flow estimation", 2010 IEEE Conference on Computer Vision and Pattern Recognition (CVPR), Jun. 13-18, 2010, San Francisco, CA, USA, IEEE, Piscataway, NJ, USA, Jun. 13, 2010, pp. 1293-1300, XP031725650.

Nawaz M.W., et al., "Motion Estimation with adaptive Regularization and neighborhood dependent constraint", Digital Image Computing: Techniques and Applications (DICTA), 2010 International Conference on, IEEE, Piscataway, NJ, USA, Dec. 1, 2010, pp. 387-392, XP031853202.

Wedel A., et al., "Structure and motion-adaptive regularization f o r high accuracy optic flow", Computer Vision, 2009 IEEE 12th International Conference on, I EEE, Piscataway, NJ, USA, Sep. 29, 2009, pp. 1663-1668, XP031672705.

Wedel et al. "An Improved Algorithm for TV-L1 Optical Flow," Statistical and Geometrical Approaches to Visual Motion Analysis. Lecture Notes in Computer Science, 5064/2008:23-45 (2009).

Wedel, et al; "Structure- and Motion-adaptive Regularization for High Accuracy Optic Flow" IEEE 12th International Conference on Computer Vision, ICCV 2009, Kyoto, Japan, Sep. 27-Oct. 4, 2009; pp. 1663-1668.

Zach et al. "A Duality Based Approach for Realtime TV-L1 Optical Flow." Proceedings of the 29th DAGM conference on Pattern recognition, pp. 214-223 (2007).

* cited by examiner

CONTENT-ADAPTIVE PIXEL PROCESSING SYSTEMS, METHODS AND APPARATUS

CROSS-REFERENCE TO RELATED APPLICATIONS

This application is a continuation of prior U.S. Non-Provisional patent application Ser. No. 13/160,457, filed Jun. 14, 2011 which issued on Oct. 8, 2013 as U.S. Pat. No. 8,553,943. The foregoing application is hereby expressly incorporated by reference in its entirety. Furthermore, any and all priority claims identified in the Application Data Sheet, or any correction thereto, are hereby incorporated by reference under 37 C.F.R. §1.57.

BACKGROUND

1. Field

The present embodiments relate to machine vision, and in particular, to content-adaptive pixel processing systems, method and apparatus flow.

2. Background

A wide range of electronic devices, including mobile wireless communication devices, personal digital assistants (PDAs), laptop computers, desktop computers, digital cameras, digital recording devices, and the like, employ machine vision techniques to provide versatile imaging capabilities. These capabilities may include functions that assist users in recognizing landmarks, identifying friends and/or strangers, and a variety of other tasks.

Augmented reality functions may also identify motion of one or more objects within an image. Optical flow is a known method for motion tracking. Rather than first trying to recognize an object from raw image pixel data and then track the motion of the object among a sequence of image frames, optical flow determination instead tracks the motion of features from raw image pixel data. There are, however, a number of issues, such as computational complexity, that make it difficult to implement known optical flow determination techniques on a mobile platform.

SUMMARY

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used to contextually adapt the processing of pixels from a sequence of image frames, performed on at least one computer processor.

One aspect of the disclosure is a method of determining pixel displacement between frames. The method includes determining a respective weighting-value for each of a first plurality of pixels. Each weighting-value is based at least in part on the relationship of an attribute of a particular pixel with the corresponding attributes of other pixels near the particular pixel. The method further includes determining an optical flow indicator of pixel displacement between two frames based at least in part upon the weighting-value of at least one pixel of the first plurality of pixels.

Another aspect of the disclosure is a computer program product for determining pixel displacement between frames that when executed cause an apparatus to determine a respective weighting-value for each of a first plurality of pixels. Each weighting-value is based at least in part on the relationship of an attribute of a particular pixel with the corresponding attributes of other pixels near the particular pixel. The instructions further cause the apparatus to determine an optical flow indicator of pixel displacement between two frames based at least in part upon the weighting-value of at least one pixel.

Another aspect of the disclosure is an apparatus configured to determine pixel displacement between frames comprising: means for determining a respective weighting-value for each of a first plurality of pixels, wherein each weighting-value is based at least in part on the relationship of an attribute of a particular pixel with the corresponding attributes of other pixels near the particular pixel; and means for determining an optical flow indicator of pixel displacement between two frames based at least in part upon the weighting-value of at least one pixel.

Another aspect of the disclosure is an apparatus configured to determine pixel displacement between frames comprising: a memory; and a processor configured to: determine a respective weighting-value for each of a first plurality of pixels, wherein each weighting-value is based at least in part on the relationship of an attribute of a particular pixel with the corresponding attributes of other pixels near the particular pixel; and determine an optical flow indicator of pixel displacement between two frames based at least in part upon the weighting-value of at least one pixel.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Figure 1:
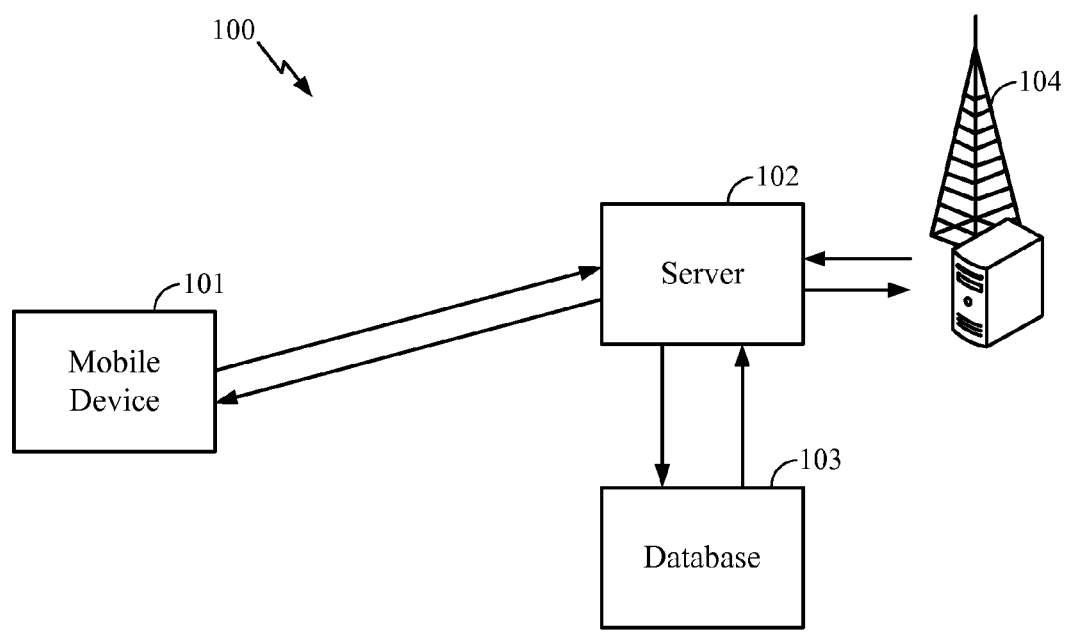
FIG. 1 is a generalized block diagram depicting a mobile device in relation to a server, database, and network transmission system, where one or more of the devices implement certain of the present embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Implementations disclosed herein provide systems, methods and apparatus configured to provide optical flow determinations for augmented and mediated reality applications on mobile platforms. Generally, augmented reality is a term for a live direct and/or indirect view of a real-world environment whose elements are supplemented by computer-generated sensory inputs, such as audible, visual and/or tactile features. Augmented reality is a subset of mediated reality, in which a real-world image is modified by adding and/or simplifying elements of the image using computer-based techniques. For the sake of convenience and brevity, the terms "augmented reality" and "mediated reality" will be used interchangeably in the description provided below. In some applications the use of mediated reality techniques allows information about the environment accessible to a user to become interactive.

Object motion tracking is a useful tool for augmented reality applications. Optical flow is a known method for motion tracking. Rather than first trying to recognize an object from raw image pixel data and then track the motion of the object among a sequence of image frames, optical flow determination instead tracks the motion of features from raw image pixel data. However, motion tracking using optical flow determination techniques is computationally expensive, thus making known optical flow determination techniques impractical for implementation on many current mobile platforms. The present embodiments contemplate modifying optical flow determination techniques so as to provide for content-adaptive optical flow determination.

Some embodiments relate to a method or system for providing optical flow determinations from a sequence of image frames, performed on at least one computer processor. According to examples of the method, weighting values associated with corresponding portions of an image may be generated. In some implementations, each weighting value represents the information value of one or more pixels. Pixels that have relatively low information value are deemphasized and pixels that have relatively high information value are emphasized in optical flow computations.

The amount of information provided by a pixel may be based on a determination of the context that the pixel provides within an image relative to the neighboring pixels. For example, in one implementation, a pixel that is surrounded by highly structured and/or organized pixel neighbors may be considered a pixel with a relatively high information value. Such a pixel is assumed to belong to a discernable feature, whose motion can be tracked within a sequence of image frames. On the other hand, a pixel surrounded by uniform or pseudo-random cluster of pixel neighbors may be considered a pixel with a relatively low information value. Such a pixel is assumed not to belong to a feature that is easily discernible within the image.

In another example, the weighting values may also be a function of dispersion. Dispersion generally refers to the separation of similar pixels from one another in an image region. Dispersion is lower where similar pixels reside near one another. Dispersion is higher where many intervening dissimilar pixels separate the similar pixels. One may also define dispersion as "high" when the pixels are so similar that no distinguishable groups can be said to exist. In turn, such pixels may be categorized as having low information values. Note that similar pixels may be "dispersed" as a whole, even if individual similar pixels reside beside one another in widely separated "clumps" or groups in the image. A "dispersion value" may indicate the degree of dispersion and provide a basis for determining the information value of one or more pixels.

In some implementations, low information value pixels are deemphasized in optical flow determinations based on the respective weighting values determined. One skilled in the art will appreciate that the weighting values referred to are with regard to the degree of information conveyed by one or more pixels, and that an actual implementation may represent a threshold or a range in a variety of forms (such as an inverse, or range). Thus, as described herein "exceeding a threshold" indicates that a sufficient amount of information is present, regardless of whatever particular implementation is employed to describe that condition. Various implementations of the optical flow determination methods may be useful, for example, in a cellular telephone that is performing motion tracking on a sequence of captured image frames. By appropriately weighting portions of the image that have low information values, the system can deemphasize those portions from an optical flow determination process. Other regions, such as regions of relatively high information value pixels may be emphasized. This method may save computational resources by reducing the number and/or complexity of optical flow computations related to pixels that are unlikely to provide useful information.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

As noted above, optical flow is a known method for motion tracking. Rather than trying to first recognize an object from raw image pixel data and then track the motion of the object among a sequence of images, optical flow determination instead tracks the motion of features from raw image pixel data. Optical flow techniques have a number of uses, such as determining the disparity of stereo vision in 3D imaging. A method of optical flow determination known as the total variation method with L1 norm regularization (TV-L1) can be implemented to provide real-time performance using a modern desktop graphics processor unit (GPU). There are, however, a number of issues that make it difficult to implement the TV-L1 method, as well as other optical flow techniques, on a mobile platform.

The TV-L1 method can be formulated according to the following cost-function:

$$\min_u \left\{ \int_\Omega |\nabla u| \, d\Omega + \lambda \int_\Omega |I_1(x+u(x)) - I_0(x)| \, d\Omega \right\} \quad (1)$$

The terms $I_0$ and $I_1$ are first and second consecutive image frames, respectively. The term $u(x)=(u1(x), u2(x))^T$ is the two-dimensional displacement field and $\lambda$ is a weighting parameter between the first and the second terms in the cost function. The first integral term within equation (1) is a smoothing term that penalizes high variation in $u(x)$ to obtain smooth displacement fields between sequential images. The second integral term within equation (1) is a fidelity term. The fidelity term is formulated under the assumption that the intensity values in the second image, $I_1(x+u(x))$, do not vary substantially as compared to the first image, $I_0(x)$. With additional local linearization and convex condition, the equation (1) can be solved iteratively.

The TV-L1 method, however, has a number of problems that make it impractical to implement on a mobile platform with limited processing resources. First, the TV-L1 method heavily regularizes motion discontinuities so that the method has difficulties processing relatively large motion fields. To compensate for the heavy regulation a "coarse-to-fine" image pyramid is typically used. Although the coarse-to-fine approach alleviates the constraint on relatively large motion, two additional problems are created. First, the coarse-to-fine image pyramid adds significant computational cost because computations have to be repeated on every level of the image pyramid. Second, the coarse-to-fine image pyramid effectively converts the original convex method into a non-convex method. Those skilled in the art will appreciate that a convex method is typically defined by a solution that will converge with iterative processing. On the other hand, for a non-convex method, while convergence may occur, it is less certain that convergence will occur after iterative processing.

Additionally, the TV-L1 method does not work well on poorly textured regions such as a uniform or pseudo-random cluster of pixels, where matching cannot be performed reliably. For example, it is difficult to reliably match pixels between frames of features such as tree leaves swaying with the wind. Conventional solutions rely on strong regularization to propagate the motion from structured into the unstructured regions. Finally, the magnitude of a computed flow using the TV-L1 method may converge whereas the direction of the flow vectors may not, leaving the results useful for object segmentation, but not useful for motion tracking or 3D reconstruction.

FIG. 1 depicts a high-level block diagram of a communications system 100 comprising a mobile device 101 in relation to a server 102, database 103, and network 104, such as a cellular network. Mobile device 101 may comprise a cell phone, laptop, personal digital assistant, or the like. Mobile device 101 may be in communication with server 102, which is itself in communication with a database 103. Server 102 may be located at a cellular base station or may be located on a local network server or router. Database 103 may similarly be located inside server 102, or at a separate location. Mobile device 101 may comprise a camera or include other means for receiving images, such as a USB, WI-FI, or Bluetooth connection. A plurality of applications may be available to the user on mobile device 101. These applications may include messaging services, image and video capture applications, and other common applications known to one skilled in the art. Some of the applications on mobile device 101 may operate on images or video received from a remote location, or operate upon images generated locally by mobile device's 101 camera. In some embodiments, database 103 may comprise an image/video storage device, and mobile device 101 may transmit and/or receive images via server 102 to and/or from database 103. These images may be generated or used by the applications operating on mobile device 101.

As mentioned above, optical flow methods may be used to track motion within a sequence of images. In some embodiments, database 103 may comprise a collection of features used to identify objects and/or features within images whose motion may be tracked. When an application on the mobile device 101 attempts to track motion within a sequence of images, the mobile device 101 may retrieve features from database 103 in order to apply the features as part of a motion tracking process. Alternatively, the features and other commonly recognized patterns may be stored locally on the mobile device 101. Server 102 may also be in communication with the network 104 and receive images or features remotely from the network. Thus, either mobile device 101 or database 103 may contain images or features stored for recognition, which may in turn be used to aid motion tracking methods.

Although FIG. 1 depicts a greatly simplified mobile system, one skilled in the art will readily recognize that the present embodiments may also apply to any imaging system. A desktop system, comprising local image storage, for example, may also implement many of the present embodiments as part of locally running optical flow determination processes.

Figure 2:
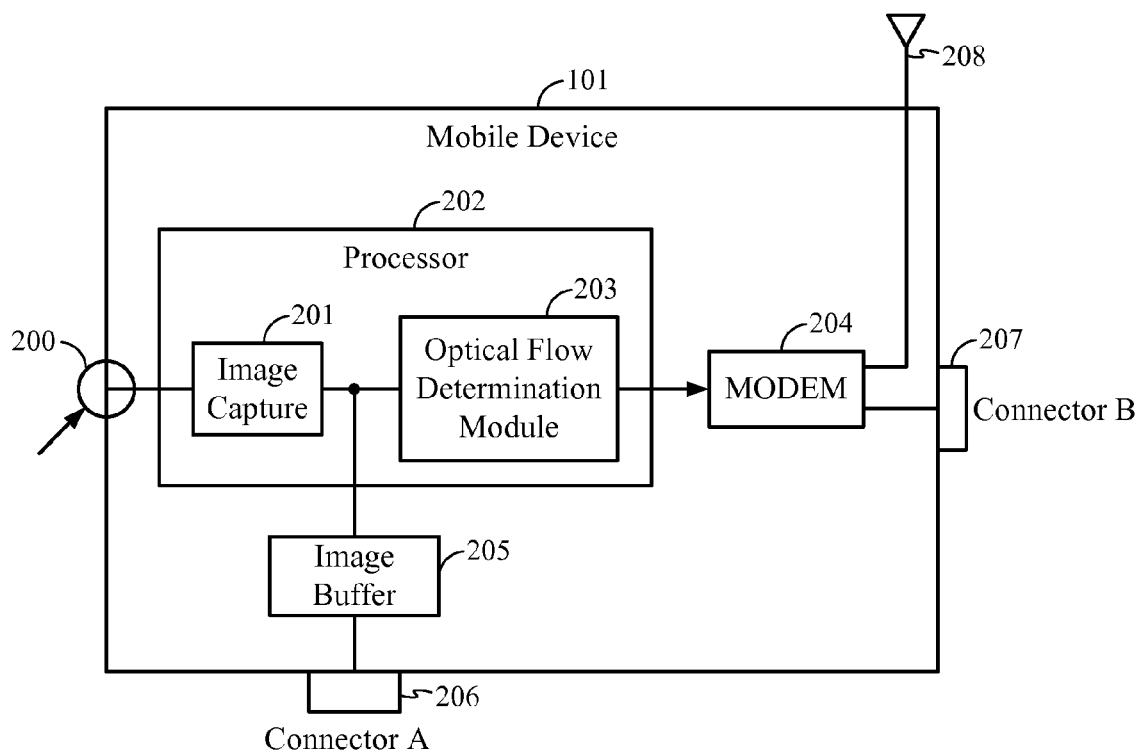
FIG. 2 is a block diagram of the mobile device's various components which certain imaging applications associated with some of the present embodiments may employ.

FIG. 2 depicts a block diagram of various components of the mobile device 101 which may be employed in the imaging applications of some embodiments. The mobile device 101 may comprise an image capturing system 201, which captures images via lens 200. These images may be stored in an image buffer 205, which may comprise RAM, SRAM, dynamic or static memory as are known in the art. Alternatively, images or features may be received via connector 206, which may comprise a firewire, USB, IR transceiver, Bluetooth interface, or the like. These images or features may be received, for example, when another user transmits them from another device, or when the user of mobile device 101 connects to a local network or storage device, such as a desktop computer.

Mobile device 101 may also comprise a modem 204 for transmitting or receiving information, including images and optical flow data via an antenna 208 or connector 207. Antenna 208 may be a wireless antenna used for connecting to a WI-FI, cellular network, or the like. Once optical flow determinations have been made, the user may upload them via modem 204 to database 103. Alternatively, the optical flow determinations may be stored locally and used locally.

The image capture system 201 may comprise a stand-alone hardware, software or firmware module. However, in some embodiments the image capture system may be integrated into the processor 202 as depicted in FIG. 2, as a component in a processor, or software running on the processor 202. The image capture system operates lens 200 so as to generate an image. Processor 202 may be a general purpose processing unit or a processor specially designed for imaging applications.

Processor 202 may comprise an optical flow determination module 203 which may itself comprise software running on the processor 202, a dedicated component within a processor or standalone hardware, software, or firmware and/or a combination thereof. The optical flow determination module 203 may implement a modified content-adaptive TV-L1 method as described below. The optical flow determination module 203 may comprise software, firmware, or hardware designed to perform one or more additional optical flow processes. As such, the optical flow determination module 203 may be able to select among various optical flow determination processes given a particular set of circumstances. One skilled in the art will readily recognize alternative applications of the present embodiments to other optical flow determination processes.

Implementations of the present invention include a content-adaptive, total variation (CA-TV) method that, in some implementations, allows optical flow computations to converge more efficiently and accurately than some implementations of the TV-L1 method including the "coarse-to-fine" image pyramid technique. More specifically, the CA-TV method disclosed herein gives more weight on pixels that are surrounded by highly structured/organized pixel neighbors in the iteration process while de-emphasizing low-information pixels such as pixels surrounded by a uniform or a pseudo-random cluster. This information or content adaptive use of image pixels enables the method, in some implementations, to converge more accurately with a reduced number of iterations, thereby reducing computational complexity. In other words, by reducing the computations concerning low-information pixel clusters, computational speed may improve so that the method may be implementable on a mobile platform having limited computational resources.

Thus, in contrast to total variation methods previously available, such as the TV-L1 method discussed above, implementations of methods in accordance with aspects of the invention provide a respective weighting-value for each pixel or a group of pixels. The weighting-values provide an indication as to which pixels are more pertinent to optical flow computations. In turn, computational resources and effort is focused on pixels with higher weights, which are more pertinent to optical flow determinations. In other words, the weighting-values enable a scheme that discriminates between pixels that are more pertinent to optical flow computations and pixels that are less pertinent to optical flow computations.

Referring again to equation (1) provided above, all pixels have the same scaling factor, $\lambda$ (i.e. weight), for the fidelity term in the conventional TV-L1 method, implying that all pixels contribute equally to the fidelity term in the optic flow computation. However, as recognized by aspects of the embodiments disclosed herein, not all pixels have the same significance in optical flow computations. A pixel cluster with almost uniform or pseudo-random distribution, in fact, contributes little because such a cluster cannot be matched reliably between sequential image frames. In accordance with aspects of the present invention, low information pixels are preferably de-emphasized in the optic flow computations whereas useful pixels are preferably emphasized. In turn, emphasizing and de-emphasizing various pixels in this way may encourage the method of solving the cost-function to converge more efficiently and accurately. Because information level or signal strength of an image is an important factor, the content-adaptive weighting of the fidelity term effectively increases the signal to noise ratio of the computation, leading to a potentially fast and reliable solution in the iterative process of solving equation (1).

In accordance with some implementations, a content-adaptive weighting term, $\lambda(x)$, can be used to weight the fidelity term so that equation (1) becomes equation (2) as follows:

$$\min_u \left\{ \int_\Omega |\nabla u| \, d\Omega + \lambda(x) \int_\Omega |I_1(x + u(x)) - I_0(x)| \, d\Omega \right\} \quad (2)$$

In equation (2), the content-adaptive weighting value, $\lambda(x)$, is a function of location variable $x=(x_1,x_2)$ that measures the information content in the neighborhood of a pixel at the location. In a non-limiting example, the content-adaptive weighting value, $\lambda(x)$, can be defined as the Fisher discrimination function that measures the informational/structural strength of the patch surrounding the pixel:

$$\lambda(x) = c * J(x) \quad (3)$$

In equation (3), the term c is a scaling constant and x is an element of Z, the set of all N locations of the neighborhood of a pixel. Suppose Z is classified into C classes. In a non-limiting example, the number of classes, C, represents the number of different colors obtained as result of color quantization. In one possible implementation $m_i$ represents the mean of the $N_i$ data points of class $Z_i$ and the following relationships can be defined.

$$m = \frac{1}{N} \sum_{x \in Z} x \quad (4)$$

$$m_i = \frac{1}{N_i} \sum_{x_i \in Z_i} x \quad (5)$$

$$S_T = \sum_{x \in Z} \|x - m\|^2 \quad (6)$$

$$S_W = \sum_{i=1}^{C} \sum_{x \in Z_i} \|x - m_i\|^2 \quad (7)$$

$$J(x) = \frac{S_T - S_W}{S_W} \quad (8)$$

Figure 3A:
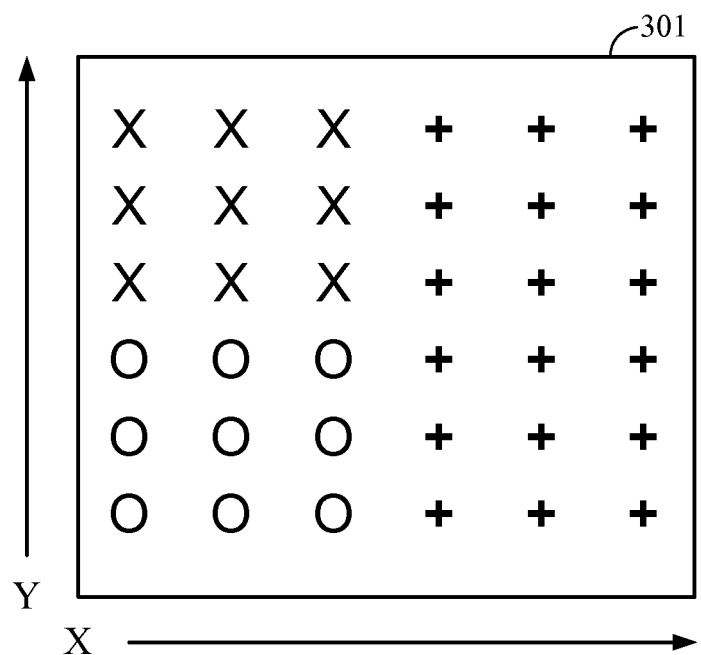
FIG. 3A illustrates one possible set of hue-based quantization levels for a 6×6 pixel block.
Figure 3B:
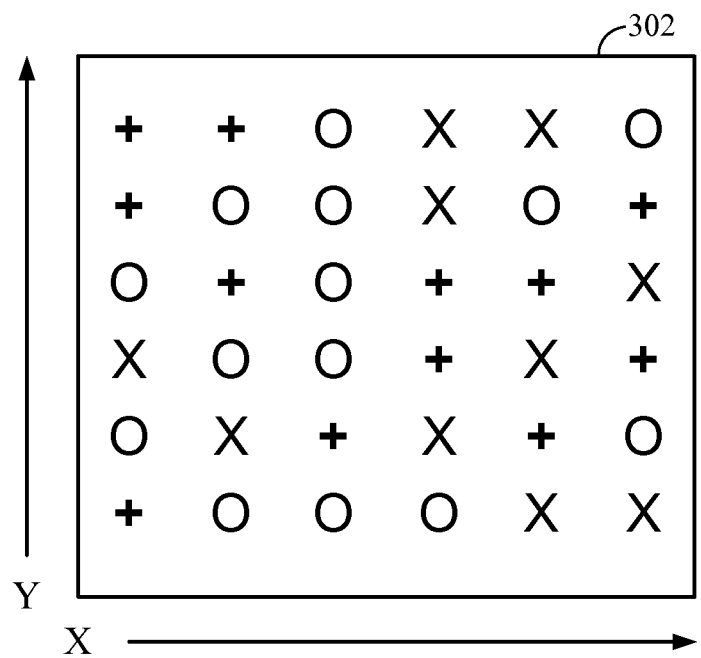
FIG. 3B illustrates one possible set of hue-based quantization levels for a 6×6 pixel block.

Equations (3) to (8) can be used to discriminate between orderly and diffused local patterns of pixels. Some examples are shown in FIGS. 3A and 3B. More specifically, FIG. 3A illustrates, as one possible example, a 6×6 image block 301 which contains 36 pixels. In one non limiting example, pixels falling within a given quantization range of the possible hues will be assigned an associated quantization level, or class ID. One skilled in the art will appreciate that there are numerous means for associating pixels with a quantization value, such as software code configured to compare the pixel value with a range. Thus, for example, the pixels of FIG. 3A may be grouped into three classes as indicated by an "X", "O" and "+", and representing red, blue and green, respectively. These three regions are relatively "homogenous" in the sense that the pixels of a given quantization level tend to reside near one another, i.e. the "X" in the upper left, the "O" in the lower left, and the "+" to the right. FIG. 3B, in contrast, illustrates a pixel block having the same dimensions, but composing a "dispersed" collection of pixels. Here pixels of a given quantization class are not necessarily located near one another within the block. As mentioned, although FIGS. 3A and 3B refer to color quantization, one skilled in the art will appreciate that there are numerous alternative pixel parameters which may be quantized.

Moreover, those skilled in the art will appreciate that the content-adaptive modification made to convert equation (1) to equation (2) may be applied to other optical flow determination methods. For example, the content-adaptive weighting value, $\lambda(x)$, can be used to modify the total variation method with L2 regularization (TV-L2) to produce equation (9) as follows:

$$\min_u \left\{ \int_\Omega |\nabla (u)|^2 \, d\Omega + \lambda(x) \int_\Omega (I_1(x + u(x)) - I_0(x))^2 \, d\Omega \right\} \quad (9)$$

Figure 4:
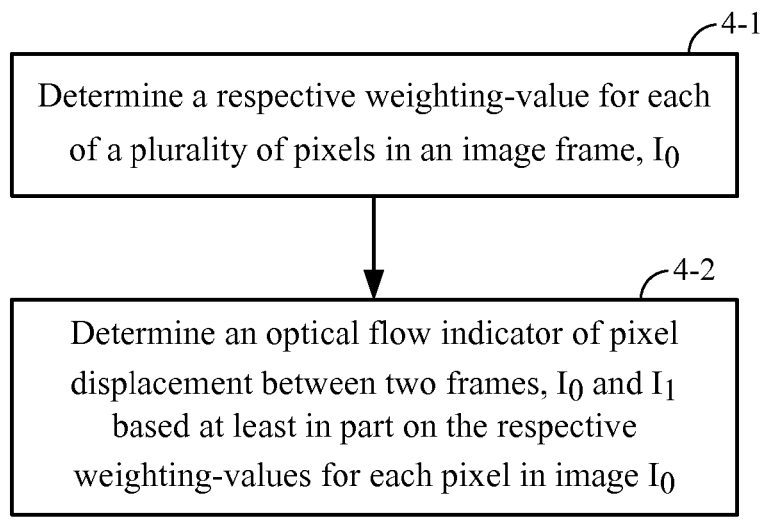
FIG. 4 is a flowchart of an implementation of a method of determining optical flow.

FIG. 4 is a flowchart of an implementation of a method of determining optical flow. In some implementations, the method is performed by a suitable combination of software, hardware and/or firmware included in an access terminal. As represented by block 4-1, the method includes determining a respective weighting value, $\lambda(x)$, for each of a plurality of pixels in a first image frame, $I_0$. In one implementation, each weighting value is determined using equations (3) to (8). In another implementation, the method include determining a respective weighting value for each of a plurality of sub-groups of two or pixels in order to further reduce the computational complexity of the method. As represented by block 4-2, the method includes determining an optical flow indicator based at least in part of the respective weighting values. In some implementations, the optical flow indicator serves as an indicator of the pixel displacement between the first frame, $I_0$, and a second frame, $I_1$.

Figure 5:
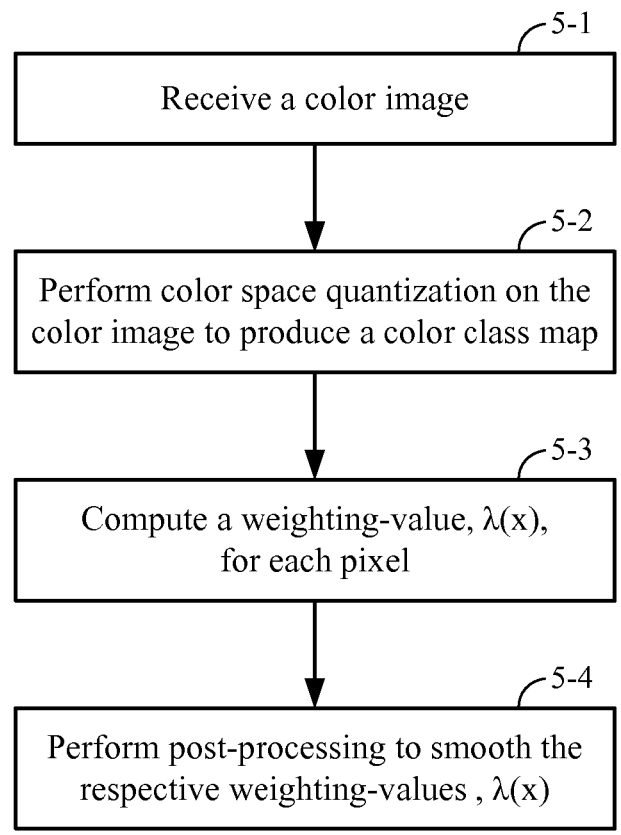
FIG. 5 is a flowchart of an implementation of a method of determining optical flow.

FIG. 5 is a flowchart of an implementation of a method of determining optical flow. In some implementations, the method is performed by a suitable combination of software, hardware and/or firmware included in an access terminal. As represented by block 5-1, the method includes receiving a color image. As represented by block 5-2, the method includes performing color space quantization on the received color image to produce a color class map. As represented by block 5-3, the method includes computing a respective weighting value, $\lambda(x)$, for each pixel in an image. In one implementation, each weighting value is determined using equations (3) to (8). In another implementation, the method include determining a respective weighting value for each of a plurality of sub-groups of two or pixels in order to further reduce the computational complexity of the method. As represented by block 5-4, the method includes performing post-processing to smooth the respective weighting values. In one implementation, smoothing includes filtering outlying pixels or pixels representing discontinuities of a structure or feature defined by neighboring pixels.

Figure 6:
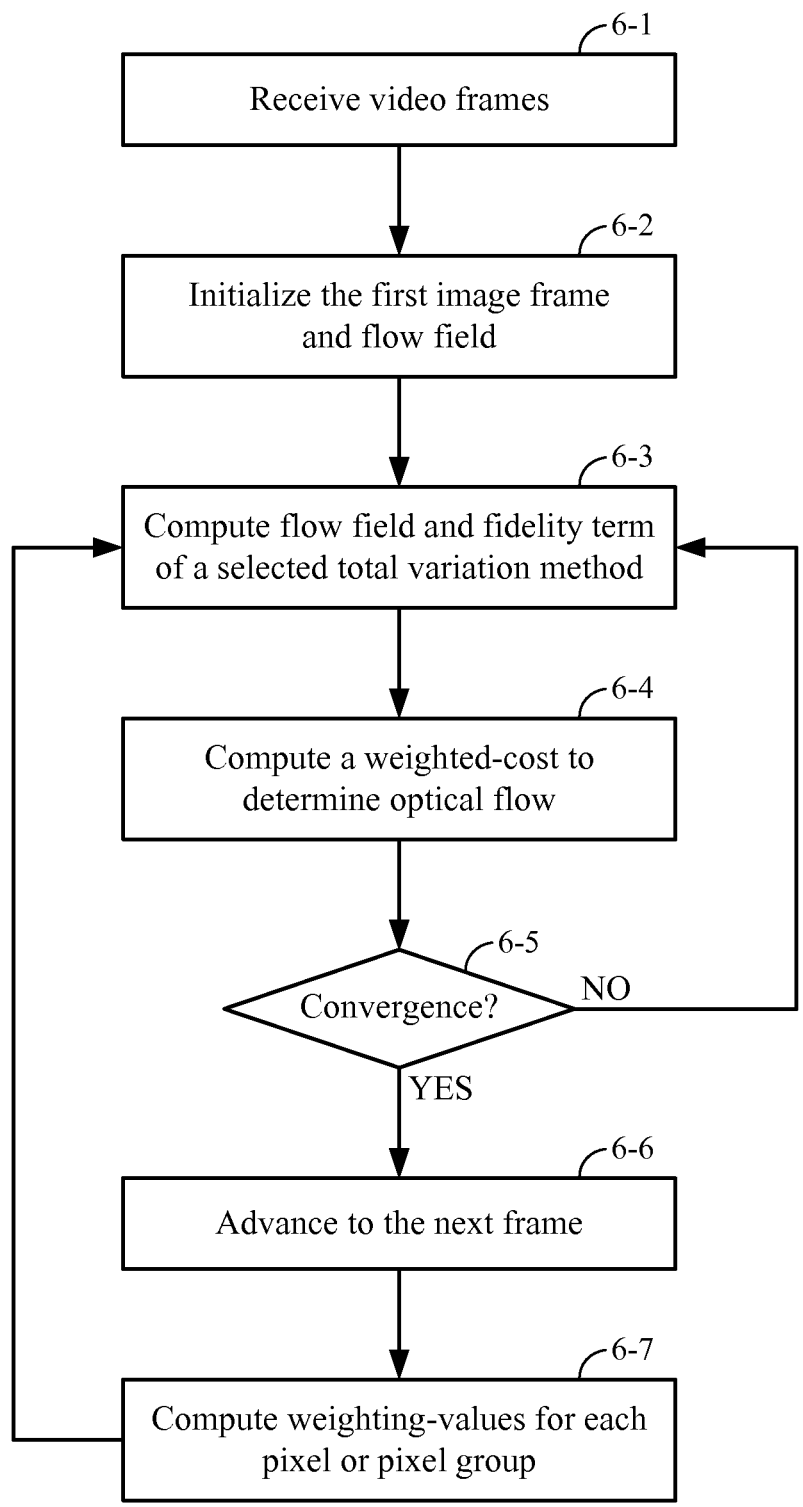
FIG. 6 is a flowchart of an implementation of a method of determining optical flow.

FIG. 6 is a flowchart of an implementation of a method of determining optical flow. In some implementations, the method is performed by a suitable combination of software, hardware and/or firmware included in an access terminal. As represented by block 6-1, the method includes receiving video frames. As represented by block 6-2, the method includes initializing a first image frame and flow field. As represented by block 6-3, the method includes computing the flow field and fidelity term of a selected total variation method. As non-limiting examples, the TV-L1 or TV-L2 methods may be selected for determining optical flow. As represented by block 6-4, the method includes computing a weighted-cost, using for example equations (2) or (9), to determine optical flow. As represented by block 6-5, the method includes determining whether or not the cost function has converged for the current frame. If the cost function has not converged (no path from 6-5), the method includes looping back to the portion of the method represented by block 6-3 until convergence occurs. On the other hand, if the cost function has converged (yes path from 6-5), as represented by block 6-6, the method includes advancing to the next frame. As represented by block 6-7, the method includes computing weighting values for each pixel or sub-group or two or more pixels.

Figure 7:
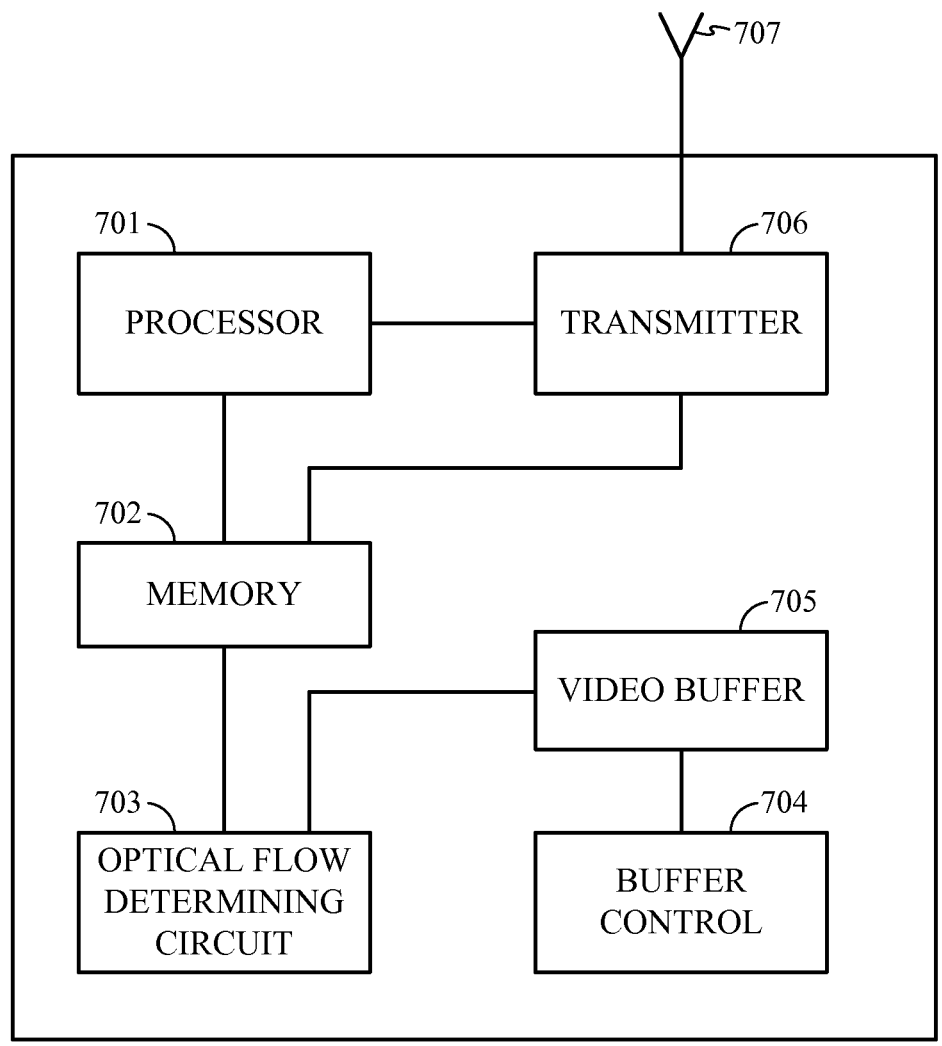
FIG. 7 is a block diagram of a of an example access terminal.

FIG. 7 is a block diagram of a of an example access terminal 700 in accordance with certain aspects of the present disclosure. Those skilled in the art will appreciate that an access terminal may have more components than the access terminal 700 illustrated in FIG. 7. The access terminal 700 includes only those components useful for describing some prominent features of implementations within the scope of the claims. The access terminal 700 includes a processor 701, a memory 702, an optical flow determining circuit 703, a buffer control circuit 704, a video buffer 705, a transmitting circuit 706 and an antenna 707. In one implementation the processor 701 is configured process computer program code of one or more applications stored in the memory. In one implementation, means for processing includes a processor. In one implementation, a storage means includes a memory. In one implementation, the optical flow determining circuit 703 is configured to determine optical flow using a content-adaptive optical flow determination method. In one implementation, means for determining optical flow includes an optical flow determining circuit 703. In one implementation, the buffer control circuit 704 is configured to determine when to allow the contents of the video buffer 705 to be passed to the optical flow determining circuit 703. In one implementation, means for controlling includes a buffer control circuit. In one implementation, means for buffering includes a buffer. In one implementation, the transmitting circuit 706 is configured to transmit packets to an access point via the antenna 707. In one implementation, means for transmitting includes a transmitter circuit.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than or equal to a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

Moreover, the word "exemplary" is used herein to mean "serving as an example, instance, or illustration." Any embodiment described herein as "exemplary" is not necessarily to be construed as preferred or advantageous over other embodiments.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method of context-adaptive pixel processing comprising:
   classifying, via an electronic device, a first plurality of pixels of a frame into one class of a plurality of classes;
   determining a respective weighting-value for each of the first plurality of pixels of the frame, wherein each weighting-value is based at least in part on a comparison of a classification of a particular one of the pixels with the classification of other pixels near the particular pixel; and
   generating a content indicator for the frame based at least in part upon the weighting-value of at least one pixel of the first plurality of pixels.

2. The method of claim 1, wherein determining the respective weighting-value for the particular pixel comprises considering a group of pixels within a radius around the particular pixel for which the weighting-value is determined.

3. The method of claim 1, wherein generating the content indicator for the frame comprises determining an optical flow indicator of pixel displacement between the frame and another frame based at least in part upon the weighting-value of at least one pixel of the first plurality of pixels.

4. The method of claim 3, wherein determining the optical flow indicator comprises using a species of the total variation method.

5. The method of claim 3, wherein determining the optical flow indicator is based on a cost function.

6. The method of claim 1, wherein the classification indicates the relative amount of information pertaining to pixel processing provided by the particular pixel as compared to other near pixels.

7. The method of claim 1, wherein the other pixels near the particular pixel include pixels adjacent the particular pixel.

8. The method of claim 7, wherein the other pixels near the particular pixel include pixels within one to ten pixel lengths of the particular pixel.

9. The method of claim 1, wherein classifying the first plurality of pixels comprises performing color space quantization to produce a color class map.

10. The method of claim 1, further comprising smoothing one or more of the weighting-values.

11. A non-transitory computer readable medium comprising instructions for context-adaptive pixel processing between frames, said instructions, when executed, cause an apparatus to:
    classify a first plurality of pixels of a frame into one class of a plurality of classes;
    determine a respective weighting-value for each of a first plurality of pixels of the frame, wherein each weighting-value is based at least in part on a comparison of a classification of a particular one of the pixels with the classification of other pixels near the particular pixel; and
    generate a content indicator for the frame based at least in part upon the weighting-value of at least one pixel of the first plurality of pixels.

12. The non-transitory computer readable medium of claim 11, wherein determining the respective weighting-value for a particular pixel comprises considering a group of pixels within a radius around the particular pixel for which the weighting-value is determined.

13. The non-transitory computer readable medium of claim 11, wherein generating the content indicator for the frame comprises determining an optical flow indicator of pixel displacement between the frame and another frame based at least in part upon the weighting-value of at least one pixel of the first plurality of pixels.

14. The non-transitory computer readable medium of claim 13, wherein determining the optical flow indicator using a species of the total variation method.

15. The non-transitory computer readable medium of claim 13, wherein determining the optical flow indicator is based on a cost function.

16. The non-transitory computer readable medium of claim 11, wherein the classification indicates the relative amount of information pertaining to pixel processing provided by the particular pixel as compared to other near pixels.

17. The non-transitory computer readable medium of claim 16, wherein the other pixels near the particular pixel include pixels adjacent the particular pixel.

18. The non-transitory computer readable medium of claim 11, wherein the other pixels near the particular pixel include pixels within one to ten pixel lengths of the particular pixel.

19. The non-transitory computer readable medium of claim 11, wherein the instructions causing the apparatus to classify the first plurality of pixels comprises instructions which further cause the apparatus to perform color space quantization to produce a color class map.

20. The non-transitory computer readable medium of claim 11, wherein the instructions further cause the apparatus to smooth one or more of the weighting-values.

21. A content-adaptive image processing apparatus comprising:
means for classifying a first plurality of pixels of a frame into one class of a plurality of classes;
means for determining a respective weighting-value for each of the first plurality of pixels of the frame, wherein each weighting-value is based at least in part on a comparison of a classification of a particular pixel with the classification of other pixels near the particular pixel; and
means for generating a content indicator for the frame based at least in part upon the weighting-value of at least one pixel of the first plurality of pixels.

22. The apparatus of claim 21, wherein said means for determining the respective weighting-value for a particular pixel comprises means for considering a group of pixels within a radius around the particular pixel for which the weighting-value is determined.

23. The apparatus of claim 21, wherein said means for generating a content indicator for the frame is configured to determine an optical flow indicator of pixel displacement between the frame and another frame based at least in part upon the weighting-value of at least one pixel of the first plurality of pixels.

24. The apparatus of claim 23, wherein said means for processing the pixels comprises means for computing the optical flow indicator using a species of the total variation method.

25. The apparatus of claim 21, wherein the classification indicates the relative amount of information pertaining to pixel processing provided by the particular pixel as compared to other near pixels.

26. The apparatus of claim 25, wherein the other pixels near the particular pixel include pixels adjacent the particular pixel.

27. The apparatus of claim 25, wherein the other pixels near the particular pixel include pixels within one to ten pixel lengths of the particular pixel.

28. The apparatus of claim 21, wherein said means for classifying comprises means for performing color space quantization to produce a color class map.

29. The apparatus of claim 21, further comprising means for smoothing one or more of the weighting-values.

30. A content-adaptive image processing apparatus comprising:
a memory; and
an image processor configured to:
classify a first plurality of pixels of a frame into one class of a plurality of classes;
determine a respective weighting-value for each of the first plurality of pixels of the frame, wherein each weighting-value is based at least in part on a comparison of a classification of a particular one of the pixels with a classification of other pixels near the particular pixel; and
generate a content indicator for the frame based at least in part upon the weighting-value of at least one pixel of the first plurality of pixels.

31. The apparatus of claim 30, wherein determining the respective weighting-value for a particular pixel comprises considering a group of pixels within a radius around the particular pixel for which the weighting-value is determined.

32. The apparatus of claim 30, wherein generating the content indicator for the frame comprises determining, via the image processor, an optical flow indicator of pixel displacement between the frame and another frame based at least in part upon the weighting-value of at least one pixel of the first plurality of pixels.

33. The apparatus of claim 32, wherein determining the optical flow indicator comprises computing, via the image processor, the optical flow indicator using a species of the total variation method.

34. The apparatus of claim 30, wherein the classification indicates the relative amount of information pertaining to pixel processing provided by the particular pixel as compared to other near pixels.

35. The apparatus of claim 30, wherein the other pixels near the particular pixel include pixels adjacent the particular pixel.

36. The apparatus of claim 35, wherein the other pixels near the particular pixel include pixels within one to ten pixel lengths of the particular pixel.

37. The apparatus of claim 30, where the image processor is configured to classify the first plurality of pixels perform color space quantization to produce a color class map.

38. The apparatus of claim 30, wherein the image processor is further configured to smooth one or more of the weighting-values.

* * * * *